United States Patent

[11] 3,595,293

[72] Inventor Anton Muller
 Unterkochen, Germany
[21] Appl. No. 825,263
[22] Filed May 16, 1969
[45] Patented July 27, 1971
[73] Assignee Eisen - und Drahtwerk Erlau AG.
 Aalen Wurt, Germany
[32] Priority Mar. 31, 1968
[33] Germany
[31] P 17 55 623.9

[54] CONNECTING LINK FOR TIRE CHAIN
 14 Claims, 4 Drawing Figs.
[52] U.S. Cl. .................................................. 152/243
[51] Int. Cl. .............................................. B60c 27/04
[50] Field of Search ........................................ 152/241,
 243, 233

[56] References Cited
UNITED STATES PATENTS
1,777,773 10/1930 Sjodin ............................ 152/241
2,825,381 3/1958 Eddy ............................. 152/241

Primary Examiner—James B. Marbert
Attorney—Walter Becker

ABSTRACT: A web-shaped longitudinal connecting link for tire chains with a circumferentially closed transverse first passage and with a second transverse passage communicating with the outside through an opening while a pin supported by the link is selectively movable in said opening to thereby reduce the free inner cross section of the opening so as to prevent a link suspended in the second passage from leaving the same.

PATENTED JUL27 1971  3,595,293

CONNECTING LINK FOR TIRE CHAIN

The present invention concerns a connecting link for tire chains with openings for receiving adjacent chain links, at least one of said openings leading toward the outside.

It is an object of the present invention to improve the connecting link so as to increase its strength without materially increasing its cross section so that the connecting link will also be able to resist very high stresses.

This object and other objects and advantages of the invention will appear more clearly from the following specification in connection with the accompanying drawing, in which.

Figure 4:
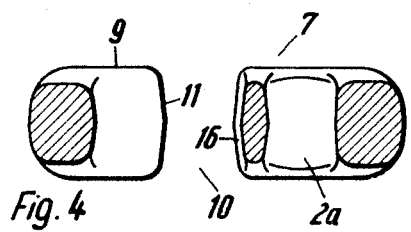
FIG. 4 is a section taken along the line IV–IV of FIG. 1.

A connecting link for tire chains with openings for receiving adjacent chain links while one of said openings leads toward the outside to permit the insertion of a chain link, is characterized in conformity with the present invention primarily in that in the chain link there is arranged a closure bolt which is movable in its longitudinal direction and is adapted in one position to close the receiving opening and in another position to free said opening, the free end of the closure bolt having associated therewith an abutment surface formed by the link and extending substantially transverse to the longitudinal direction of the link. In this way the free end of the closure bolt is safely supported so that further chain links suspended in the engaging link cannot press the closure bolt toward the side in such a way that the receiving opening of the connecting link will be freed. Furthermore, the design of the link according to the present invention will prevent the closure bolt from being pressed out of the receiving opening because the abutment surface of the connecting link will act as abutment for the free end of the closure bolt.

Referring now to the drawing in detail, a connecting link is shown therein with the essential features which individually and in cooperation with each other will improve the connecting link as to the mode of its manufacture and also as to its use over heretofore known and customary connecting links.

As shown in FIGS. 1–4, the connecting link 1 is designed as a web member of high strength. The lateral surfaces 6 of link 1 extend at an incline from the bottom running surface 4 and also from the oppositely located tire-engaging surface 3 toward the central portion of the height of the link in such a way that the cross section of the connecting link has a substantially double trapezoidal contour while being of low weight. The bottom running surface 4 is formed by two inclined individual surfaces defined by an obtuse angle. These surfaces 4 intersect along the longitudinal central plane of the connecting link and form acute angles with the lateral surfaces 6 with which they merge.

One side of the web-shaped connecting link 1 is provided with a continuous receiving opening 2a, which is closed over its entire circumference and is intended for receiving a chain link. The other side of the connecting link 1 has a longitudinal or oblong receiving opening 2 into which leads an introducing passage 10 which is located near the central transverse plane of the connecting link 1. That web portion 5 which comprises the running surface 4 is provided with a bore 13 which is inclined in conformity with the passage 10. A closure bolt 14 is with press fit guided in said bore 13 in such a way that the connection between the receiving opening 2 and the introducing passage 10 can be closed to such an extent that a chain link suspended in the receiving opening 2 can no longer be withdrawn from the opening The strength at which the closure bolt 14 secures the chain links interconnected by the connecting link with regard to the latter is very high even though the closure bolt is of relatively small dimensions because the closure bolt, when occupying its closing position, is supported almost over its entire length on one side thereof. As will be seen from FIG. 2, that portion of the web member of the link which comprises the bore 13 for receiving the closure member 14 has outer lateral surfaces which flare toward the outside so that the connecting link will have its largest cross section where the bore 13 for the closure bolt 14 is provided.

Figure 3:
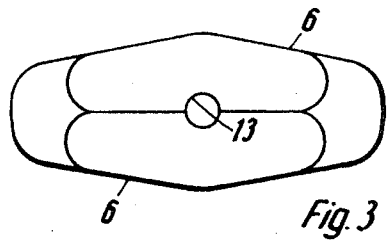
FIG. 3 is a view of the connecting link according to FIG. 1 as seen from below.
Figure 2:
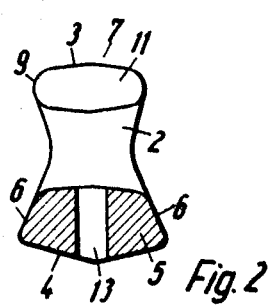
FIG. 2 represents a section taken along the line II–II of FIG. 1.

That side of the connecting link which faces the closed receiving opening 2a is provided with an abutment surface 16 which is inclined to the longitudinal direction of the bore 13. The free end 15a of the closure bolt 14 will thus engage the surface 16 in such a way that the closure bolt will be safely supported thereby. The engaging surface 16 is so arranged that the free end 15a of the bolt, when the bolt 14 is hammered into the link, will increasingly be deviated by the surface 16 in the direction toward the passage 16 with the result that the bolt eventually assumes a curved preloaded position and thereby will be clamped against the surface 16. The engaging surface 16 is substantially perpendicular to the longitudinal central plane through the link so that forces directed transverse to the longitudinal central plane of the connecting link will not be conveyed to the closure bolt 14. The closure bolt may be subjected to forces above and below its limit of elasticity in a direction transverse to is longitudinal direction. THe inclined engaging or abutment surface 16 forms one wall of the passage 10. The wall surface 11 which is located opposite to the surface 16 and is formed by the end face of the nose 12 extends substantially perpendicularly with regard to the longitudinal central plane of the connecting link 1 and is substantially parallel to the longitudinal direction of the bore 13. However, if desired, the engaging surface 16 may also be perpendicular to the longitudinal direction of the closure bolt 14 so that the closure bolt may have its end surface in engagement with the engaging surface 16. In FIGS. 2—4 the closure bolt 14 has been omitted.

Due to the fact that the receiving openings 2, 2a are located eccentrically in the connecting link 1, the web portion 5 which comprises the running surface 4 has a greater height than the web portion 7 which comprises the tire-engaging surface 3. The lateral surfaces 9 of the last-mentioned web portions 7 form a portion of a circle in such a way that the web portion 7 has an approximately elliptical or oblong cross section. The corner areas of the substantially rectangular connecting link 1 are rounded over a quarter of a circle. As will be seen from FIG. 3, that web portion 5 which comprises the running surface 4 is from both link ends toward the central portion of the length of the link broadened uniformly so that the web 5 will have its greatest width in the longitudinal central portion of the link 1. The web portion 7 which comprises the tire-engaging surface 3 has the same width over its entire length as clearly shown in FIG. 4.

Due to the fact that the free end 15a of the closure bolt 14 extends into the introducing passage 10 of the link 1, chain links suspended in the receiving opening 2 cannot detach themselves from the connecting link 1 because the spacing of the front end 15a of the closure bolt 14 from the end face 11 of the nose 12 is less than the corresponding cross section of the suspended chain link. When the closure bolt 14 is in its closing position shown in FIG. 1, the end face of the rear end 15 of the closure bolt is located substantially in the running surface 4. The longitudinal axis of the closure bolt passes through the receiving opening so that the closure bolt in mounted condition thereof may have its free end in the passage 10.

Figure 1:
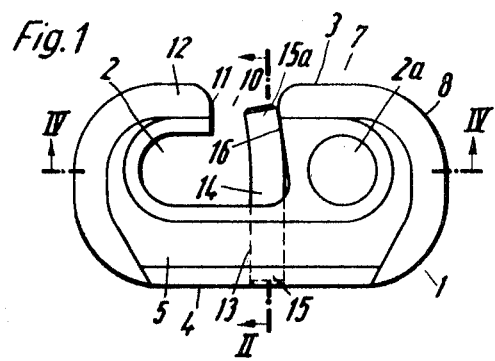
FIG. 1 is a side view of a connecting link according to the present invention.

For purposes of removing the closure bolt 14 from its closing position shown in FIG. 1, the closure bolt is hammered through the bore 13 in one of the two possible directions, for instance by means of a mandrel, so that the chain links suspended in link 1 can be removed therefrom. The thus displaced closure bolt 14 may, for instance, from the running surface 4, again be hammered through the bore 13 into its closing position.

It is, of course, to be understood that the present invention is, by no means, limited to the particular construction shown in the drawing but also comprises any modifications within the scope of the appended claims.

What I claim is:

1. A connecting link for tire chains having one longitudinal surface forming the running surface of the connecting link and having another longitudinal surface forming the tire-engaging surface of said connecting link, said connecting link being provided with first passages therethrough having their axes extending in a direction transverse to the longitudinal direction of said connecting link, said connecting link also having a second passage extending from one of said longitudinal surfaces to one of said first passages and being so dimensioned as to permit the introduction of a chain link therethrough into the respective second passage communicating therewith, and closure pin means with opposite ends engaged as displaceably supported by said connecting link and operable selectively to be moved into and out of said second passage to respectively reduce its free cross section so as to prevent a chain link previously introduced through said second passage into said first passage communicating therewith from leaving the latter and permitting the chain link introduced into said last-mentioned first passage to be withdrawn through said second passage.

2. A connecting link according to claim 1, in which said second passage is partially defined by a transverse wall portion of said connecting link which wall portion directly engages the closure pin means when the latter extends into said first passage for positively supporting said closure pin means.

3. A connecting link according to claim 2, which is provided with a bore for receiving and supporting said closure pin means, and in which said closure pin means engaging wall portion is inclined with regard to the extension of the longitudinal axis of said bore.

4. A connecting link according to claim 3, in which the extension of the axis of said bore and the closure pin means engaging wall portion define with each other an angle of about 10°.

5. A connecting link according to claim 1, in which the longitudinal axis of said closure pin means is located substantially in the longitudinal central plane of said connecting link.

6. A connecting link according to claim 1, in which said closure pin means extends substantially transverse to the running surface.

7. A connecting link according to claim 1, in which said closure pin means extends perpendicular with regard to said running surface.

8. A connecting link according to claim 1, which is web-shaped and has at least one side designed so as to form a hook, and in which said closure pin means is movable within the opening defined by said hook.

9. A connecting link according to claim 8, in which one of said first passages is circumferentially completely closed, and in which said closure pin means engaging wall portion is formed by that portion of the web which is located opposite said hook and adjacent said circumferentially completely closed first passage.

10. A connecting link according to claim 1, in which the bore receiving said closure pin means extends through said running surface approximately in the center portion of the length thereof.

11. A connecting link according to claim 1, in which portions of said link support said closure pin means over nearly its entire length.

12. A connecting link according to claim 1, in which the bore for receiving said closure pin means extends all the way through from said running surface into said first passage which communicates with said second passage.

13. A connecting link according to claim 1, in which the cross-sectional contour of said link is double trapezoidal with the narrower sides of the trapezoids joined to each other and with the lateral surfaces tapering toward each other from the running surface and the tire-engaging surface respectively.

14. A connecting link according to claim 3, in which that portion of the link which contains the bore has the greatest width.